US011870151B2

(12) United States Patent
Lin

(10) Patent No.: US 11,870,151 B2
(45) Date of Patent: Jan. 9, 2024

(54) ANTENNA ARRAY

(71) Applicant: Wistron Corp., New Taipei (TW)

(72) Inventor: Po-Tsang Lin, New Taipei (TW)

(73) Assignee: WISTRON CORP., New Taipei (TW)

( * ) Notice: Subject to any disclaimer, the term of this patent is extended or adjusted under 35 U.S.C. 154(b) by 32 days.

(21) Appl. No.: 17/561,791

(22) Filed: Dec. 24, 2021

(65) Prior Publication Data

US 2023/0147065 A1 May 11, 2023

(30) Foreign Application Priority Data

Nov. 10, 2021 (TW) ................................ 110141789

(51) Int. Cl.
*H01Q 21/28* (2006.01)
*H01Q 21/06* (2006.01)
*H01Q 21/30* (2006.01)

(52) U.S. Cl.
CPC ........... *H01Q 21/28* (2013.01); *H01Q 21/065* (2013.01); *H01Q 21/30* (2013.01)

(58) Field of Classification Search
CPC ....... H01Q 21/30; H01Q 21/065; H01Q 21/28
See application file for complete search history.

(56) References Cited

U.S. PATENT DOCUMENTS

| | | | | |
|---|---|---|---|---|
| 9,297,701 B2 * | 3/2016 | Sasaki | ................... | G01J 5/0225 |
| 11,005,190 B1 | 5/2021 | Lin et al. | | |
| 2016/0379021 A1 * | 12/2016 | Bellows | ............. | G06K 7/10356 340/10.1 |
| 2021/0135375 A1 * | 5/2021 | Lin | ...................... | H01Q 9/0464 |

* cited by examiner

*Primary Examiner* — Graham P Smith
(74) *Attorney, Agent, or Firm* — McClure, Qualey & Rodack, LLP

(57) ABSTRACT

An antenna array includes a first antenna unit, a second antenna unit, a third antenna unit, a fourth antenna unit, a first auxiliary metal element, a second auxiliary metal element, a third auxiliary metal element, and a fourth auxiliary metal element. The first auxiliary metal element is adjacent to the first antenna unit. The second auxiliary metal element is adjacent to the second antenna unit. The third auxiliary metal element is adjacent to the third antenna unit. The fourth auxiliary metal element is adjacent to the fourth antenna unit. The first auxiliary metal element, the second auxiliary metal element, the third auxiliary metal element, and the fourth auxiliary metal element are configured to increase the radiation gain of the antenna array.

20 Claims, 9 Drawing Sheets

ANTENNA ARRAY

CROSS REFERENCE TO RELATED APPLICATIONS

This application claims priority of Taiwan Patent Application No. 110141789 filed on Nov. 10, 2021, the entirety of which is incorporated by reference herein.

BACKGROUND OF THE INVENTION

Field of the Invention

The disclosure generally relates to an antenna array, and more particularly, to an antenna array for increasing radiation gain.

Description of the Related Art

With the advancements being made in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi and Bluetooth systems and using frequency bands of 2.4 GHz, 5.2 GHz, and 5.8 GHz.

Antenna arrays are widely used in the fields of military technology, radar detection, life detection, and health monitoring. Therefore, it has become a critical challenge for a current designer to design an antenna array with high radiation gain and thereby improve communication performance.

BRIEF SUMMARY OF THE INVENTION

In an exemplary embodiment, the invention is directed to an antenna array that includes a first antenna unit, a second antenna unit, a third antenna unit, a fourth antenna unit, a first auxiliary metal element, a second auxiliary metal element, a third auxiliary metal element, and a fourth auxiliary metal element. The first auxiliary metal element is adjacent to the first antenna unit. The second auxiliary metal element is adjacent to the second antenna unit. The third auxiliary metal element is adjacent to the third antenna unit. The fourth auxiliary metal element is adjacent to the fourth antenna unit. The first auxiliary metal element, the second auxiliary metal element, the third auxiliary metal element, and the fourth auxiliary metal element are configured to increase the radiation gain of the antenna array.

In some embodiments, the first antenna unit, the second antenna unit, the third antenna unit, and the fourth antenna unit cover a first frequency band and a second frequency band of millimeter-wave operations.

In some embodiments, each of the first auxiliary metal element, the second auxiliary metal element, the third auxiliary metal element, and the fourth auxiliary metal element substantially has a square shape.

In some embodiments, each of the first auxiliary metal element, the second auxiliary metal element, the third auxiliary metal element, and the fourth auxiliary metal element substantially has a square-ring shape.

In some embodiments, each of the first auxiliary metal element, the second auxiliary metal element, the third auxiliary metal element, and the fourth auxiliary metal element substantially has a circular-ring shape.

In some embodiments, the antenna array further includes a dielectric substrate and a ground metal plane. The dielectric substrate has a first surface and a second surface which are opposite to each other. The ground metal plane is disposed on the second surface of the dielectric substrate.

In some embodiments, the first antenna unit includes a first metal loop and a first feeding metal element. The first feeding metal element is coupled to a first signal source and is adjacent to the first metal loop. The second antenna unit includes a second metal loop and a second feeding metal element. The second feeding metal element is coupled to a second signal source and is adjacent to the second metal loop. The third antenna unit includes a third metal loop and a third feeding metal element. The third feeding metal element is coupled to a third signal source and is adjacent to the third metal loop. The fourth antenna unit includes a fourth metal loop and a fourth feeding metal element. The fourth feeding metal element is coupled to a fourth signal source and is adjacent to the fourth metal loop. The first metal loop, the second metal loop, the third metal loop, and the fourth metal loop are disposed on the first surface of the dielectric substrate.

In some embodiments, the first auxiliary metal element has a first vertical projection on the first surface of the dielectric substrate, and the first vertical projection at least partially overlaps the first metal loop. The second auxiliary metal element has a second vertical projection on the first surface of the dielectric substrate, and the second vertical projection at least partially overlaps the second metal loop. The third auxiliary metal element has a third vertical projection on the first surface of the dielectric substrate, and the third vertical projection at least partially overlaps the third metal loop. The fourth auxiliary metal element has a fourth vertical projection on the first surface of the dielectric substrate, and the fourth vertical projection at least partially overlaps the fourth metal loop.

In some embodiments, the first auxiliary metal element, the second auxiliary metal element, the third auxiliary metal element, the fourth auxiliary metal element, the first metal loop, the second metal loop, the third metal loop, and the fourth metal loop substantially have the same perimeters.

In some embodiments, a first distance is defined between the first auxiliary metal element and the first metal loop, a second distance is defined between the second auxiliary metal element and the second metal loop, a third distance is defined between the third auxiliary metal element and the third metal loop, and a fourth distance is defined between the fourth auxiliary metal element and the fourth metal loop. Each of the first distance, the second distance, the third distance, and the fourth distance is from 0.125 to 0.5 wavelength of the first frequency band.

In some embodiments, each of the first metal loop, the second metal loop, the third metal loop, and the fourth metal loop substantially has a relatively large square shape.

In some embodiments, the first metal loop has a first hollow portion, the second metal loop has a second hollow portion, the third metal loop has a third hollow portion, and the fourth metal loop has a fourth hollow portion. Each of the first hollow portion, the second hollow portion, the third hollow portion, and the fourth hollow portion substantially has a relatively small square shape.

In some embodiments, the length of each of the first hollow portion, the second hollow portion, the third hollow portion, and the fourth hollow portion is substantially equal to 0.25 wavelength of the first frequency band.

In some embodiments, the center-to-center distance between any adjacent two of the first metal loop, the second metal loop, the third metal loop, and the fourth metal loop is from 0.4 to 1 wavelength of the first frequency band.

In some embodiments, the first feeding metal element, the second feeding metal element, the third feeding metal element, and the fourth feeding metal element are embedded in the dielectric substrate and between the first surface and the second surface.

In some embodiments, each of the first feeding metal element, the second feeding metal element, the third feeding metal element, and the fourth feeding metal element substantially has an L-shape.

In some embodiments, each of the first feeding metal element, the second feeding metal element, the third feeding metal element, and the fourth feeding metal element is at least partially perpendicular to and at least partially parallel to the corresponding one of the first metal loop, the second metal loop, the third metal loop, and the fourth metal loop.

In some embodiments, the length of each of the first feeding metal element, the second feeding metal element, the third feeding metal element, and the fourth feeding metal element is substantially equal to 0.25 wavelength of the second frequency band.

In some embodiments, a first feeding point and a second feeding point are respectively positioned at two ends of the first feeding metal element, a third feeding point and a fourth feeding point are respectively positioned at two ends of the second feeding metal element, a fifth feeding point and a sixth feeding point are respectively positioned at two ends of the third feeding metal element, and a seventh feeding point and an eighth feeding point are respectively positioned at two ends of the fourth feeding metal element.

In some embodiments, the first signal source is coupled to the first feeding point or the second feeding point so as to excite the first antenna unit, the second signal source is coupled to the third feeding point or the fourth feeding point so as to excite the second antenna unit, the third signal source is coupled to the fifth feeding point or the sixth feeding point so as to excite the third antenna unit, and the fourth signal source is coupled to the seventh feeding point or the eighth feeding point so as to excite the fourth antenna unit.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
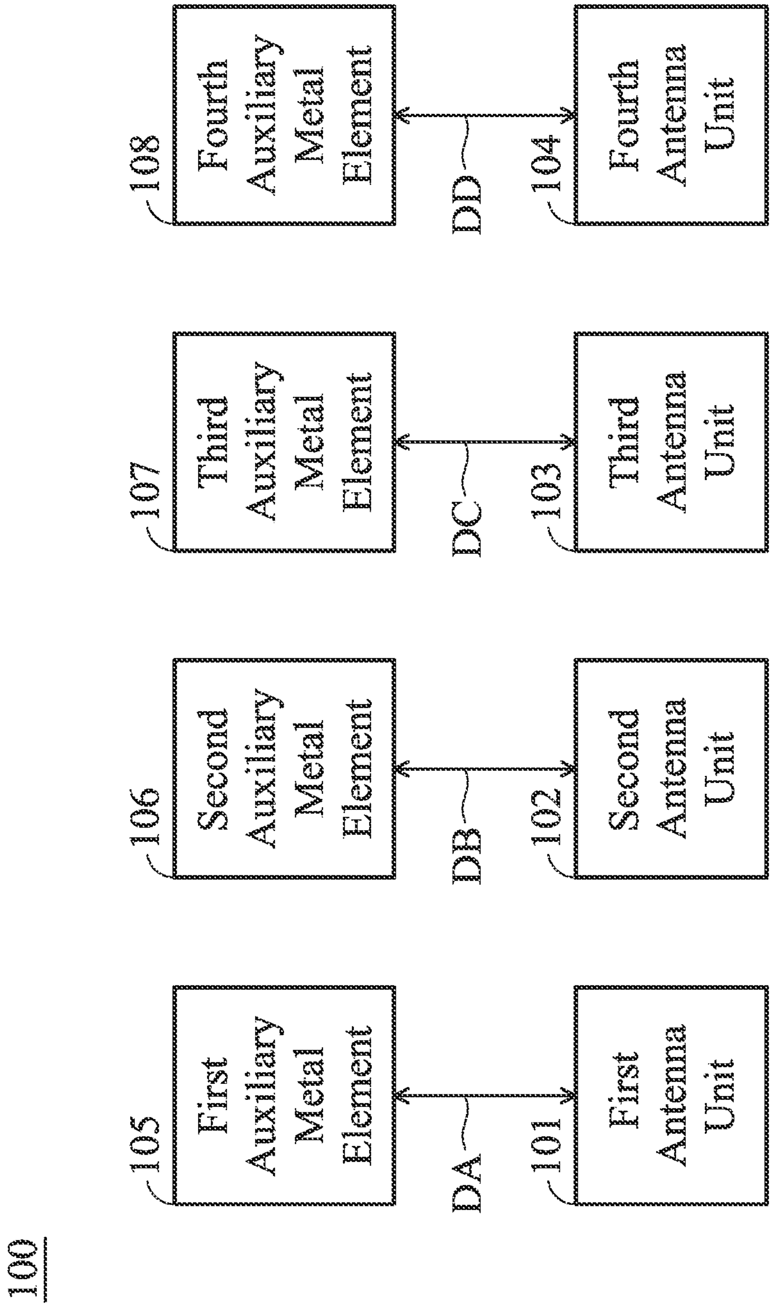
FIG. 1 is a diagram of an antenna array according to an embodiment of the invention.

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of an antenna array 100 according to an embodiment of the invention. The antenna array 100 may be applied to a mobile device, such as a smartphone, a tablet computer, or a notebook computer. As shown in FIG. 1, the antenna array 100 includes a first antenna unit 101, a second antenna unit 102, a third antenna unit 103, a fourth antenna unit 104, a first auxiliary metal element 105, a second auxiliary metal element 106, a third auxiliary metal element 107, and a fourth auxiliary metal element 108. The shapes and types of aforementioned antenna units and auxiliary metal elements are not limited in the invention. It should be understood that the antenna array 100 may further include other elements, such as an RF (Radio Frequency) module including a plurality of signal sources, and a plurality of power amplifiers, although they are not displayed in FIG. 1.

The first auxiliary metal element 105 is disposed adjacent to the first antenna unit 101, and they may be substantially aligned with each other. The second auxiliary metal element 106 is disposed adjacent to the second antenna unit 102, and they may be substantially aligned with each other. The third auxiliary metal element 107 is disposed adjacent to the third antenna unit 103, and they may be substantially aligned with each other. The fourth auxiliary metal element 108 is disposed adjacent to the fourth antenna unit 104, and they may be substantially aligned with each other. It should be noted that the term "adjacent" or "close" over the disclosure means that the distance (spacing) between two corresponding elements is smaller than a predetermined distance (e.g., 10 mm or shorter), but usually does not mean that the two corresponding elements directly touch each other (i.e., the aforementioned distance/spacing therebetween is reduced to 0). For example, a first distance DA may be defined between the first auxiliary metal element 105 and the first antenna unit 101. A second distance DB may be defined between the second auxiliary metal element 106 and the second antenna unit 102. A third distance DC may be defined between the third auxiliary metal element 107 and the third antenna unit 103. A fourth distance DD may be defined between the fourth auxiliary metal element 108 and the fourth antenna unit 104.

Figure 2:
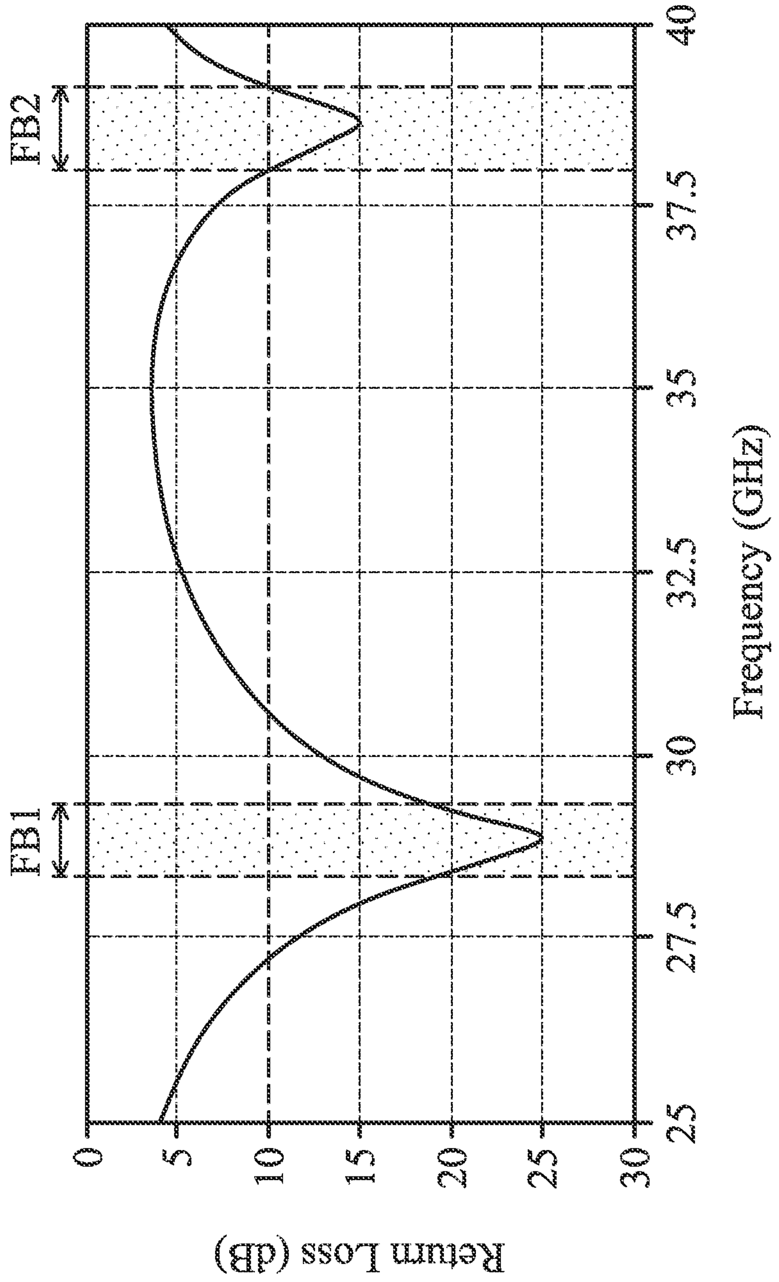
FIG. 2 is a diagram of return loss of an antenna array according to an embodiment of the invention.

FIG. 2 is a diagram of return loss of the antenna array 100 according to an embodiment of the invention. The horizontal axis represents the operation frequency (GHz), and the vertical axis represents the return loss (dB). According to the measurement of FIG. 2, the first antenna unit 101, the second antenna unit 102, the third antenna unit 103, and the fourth antenna unit 104 of the antenna array 100 can cover a first frequency band FB1 and a second frequency band FB2 of millimeter-wave operations. For example, the first frequency band FB1 may be at about 28 GHz, and the second frequency band FB2 may be at about 39 GHz. Accordingly, the antenna array 100 can support the wideband operations of next-generation 5G communication.

It should be noted that the first auxiliary metal element 105, the second auxiliary metal element 106, the third auxiliary metal element 107, and the fourth auxiliary metal element 108 resonate with the first antenna unit 101, the second antenna unit 102, the third antenna unit 103, and the fourth antenna unit 104, respectively, so as to increase the radiation gain of the antenna array 100 operating in the first frequency band FB1 and the second frequency band FB2. According to practical measurements, when each of the first distance DA, the second distance DB, the third distance DC, and the fourth distance DD is from 0.125 to 0.5 wavelength of the first frequency band FB1 (i.e., $\lambda/8 \sim \lambda/2$), the radiation gain of the antenna array 100 can be maximized. With such a design, the whole radiation performance of the antenna array 100 will not be negatively affected even if the antenna array 100 is covered by a nonconductive housing of a mobile device or is blocked by an antenna window.

The following embodiments will introduce different configurations and detailed structural features of the antenna array 100. It should be understood that these figures and descriptions are merely exemplary, rather than limitations of the invention.

Figure 3A:
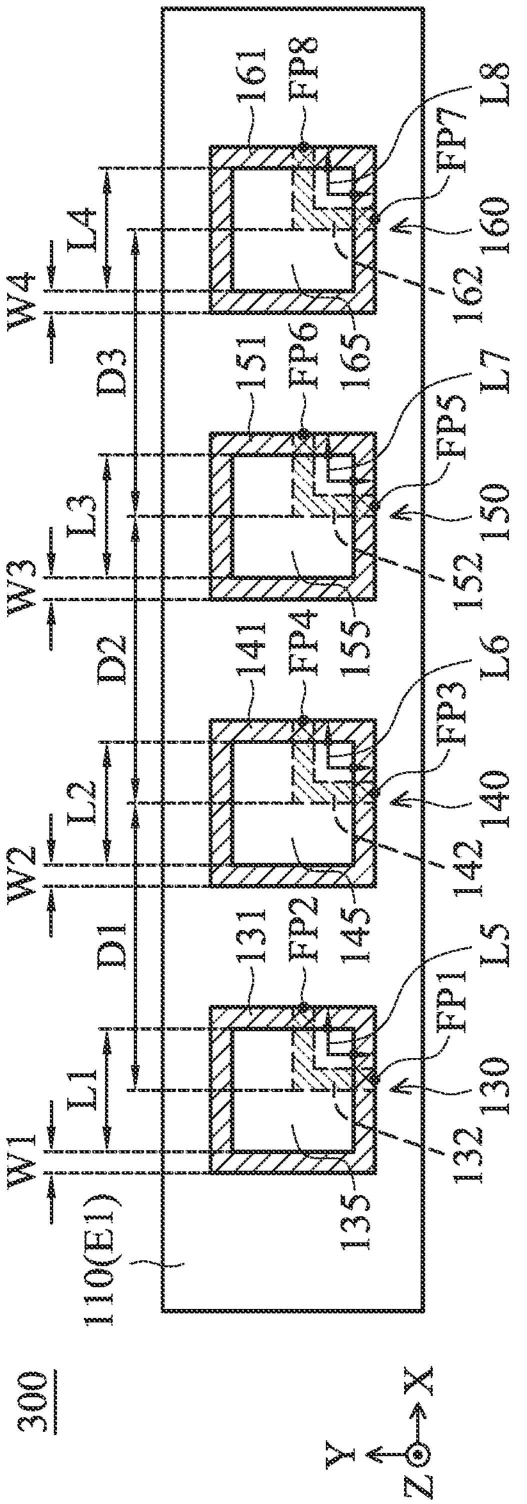
FIG. 3A is a top view of an antenna array according to an embodiment of the invention.
Figure 3B:
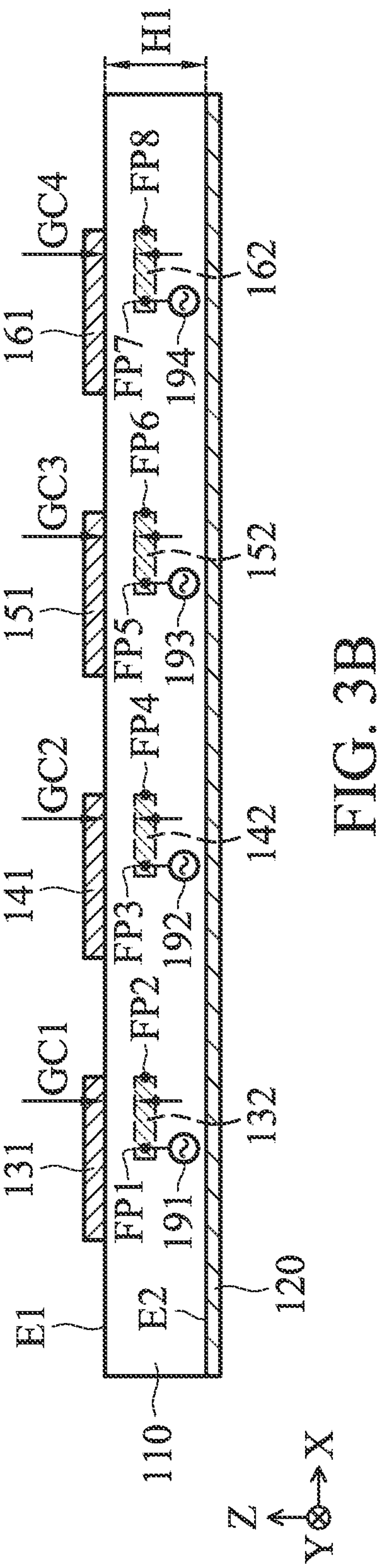
FIG. 3B is a side view of an antenna array according to an embodiment of the invention.

FIG. 3A is a top view of an antenna array 300 according to an embodiment of the invention. FIG. 3B is a side view of the antenna array 300 according to an embodiment of the invention. In the embodiment of FIG. 3A and FIG. 3B, the antenna array 300 at least includes a dielectric substrate 110, a ground metal plane 120, a first antenna unit 130, a second antenna unit 140, a third antenna unit 150, and a fourth antenna unit 160. The antenna array 300 can also cover the first frequency band FB1 and the second frequency band FB2 as mentioned above. In order to simplify the figures, the first auxiliary metal element, the second auxiliary metal element, the third auxiliary metal element, and the fourth auxiliary metal element are not displayed in FIG. 3A and FIG. 3B, but they will be illustrated in detail in the following embodiments.

The dielectric substrate 110 has a first surface E1 and a second surface E2 which are opposite to each other. The ground metal plane 120 is disposed on the second surface E2 of the dielectric substrate 110, so as to provide a ground voltage. The dielectric substrate 110 may be a Rogers substrate made of, for example, an RO4350B material. However, the invention is not limited thereto. In alternative embodiments, adjustments to the design may be made to the effect that the dielectric substrate 110 may be an FR4 (Flame Retardant 4) substrate, a PCB (Printed Circuit Board), or an FPC (Flexible Printed Circuit). The ground metal plane 120 may substantially have a rectangular shape to cover the whole second surface E2 of the dielectric substrate 110.

The first antenna unit 130 includes a first metal loop 131 and a first feeding metal element 132. For example, the first metal loop 131 may substantially have a relatively large square shape. The first metal loop 131 is disposed on the first surface E1 of the dielectric substrate 110. The first metal loop 131 has a first hollow portion 135. The first hollow portion 135 may substantially have a relatively small square shape. The first feeding metal element 132 may substantially have an L-shape. The first feeding metal element 132 may be at least partially perpendicular to and at least partially parallel to the first metal loop 131. The first feeding metal element 132 may be embedded in the dielectric substrate 110 and between the first surface E1 and the second surface E2. The first feeding metal element 132 is coupled to a first signal source 191 and is adjacent to the first metal loop 131. A first coupling gap GC1 may be formed between the first metal loop 131 and the first feeding metal element 132. Specifically, a first feeding point FP1 and a second feeding point FP2 are respectively positioned at two ends of the first feeding metal element 132. The first signal source 191 is coupled to either the first feeding point FP1 or the second feeding point FP2, so as to excite the first antenna unit 130.

The second antenna unit 140 includes a second metal loop 141 and a second feeding metal element 142. For example, the second metal loop 141 may substantially have a relatively large square shape. The second metal loop 141 is disposed on the first surface E1 of the dielectric substrate 110. The second metal loop 141 has a second hollow portion 145. The second hollow portion 145 may substantially have a relatively small square shape. The second feeding metal element 142 may substantially have an L-shape. The second feeding metal element 142 may be at least partially perpendicular to and at least partially parallel to the second metal loop 141. The second feeding metal element 142 may be embedded in the dielectric substrate 110 and between the first surface E1 and the second surface E2. The second feeding metal element 142 is coupled to a second signal source 192 and is adjacent to the second metal loop 141. A second coupling gap GC2 may be formed between the second metal loop 141 and the second feeding metal element 142. Specifically, a third feeding point FP3 and a fourth feeding point FP4 are respectively positioned at two ends of the second feeding metal element 142. The second signal source 192 is coupled to either the third feeding point FP3 or the fourth feeding point FP4, so as to excite the second antenna unit 140.

The third antenna unit 150 includes a third metal loop 151 and a third feeding metal element 152. For example, the third metal loop 151 may substantially have a relatively large square shape. The third metal loop 151 is disposed on the first surface E1 of the dielectric substrate 110. The third metal loop 151 has a third hollow portion 155. The third hollow portion 155 may substantially have a relatively small square shape. The third feeding metal element 152 may substantially have an L-shape. The third feeding metal element 152 may be at least partially perpendicular to and at least partially parallel to the third metal loop 151. The third feeding metal element 152 may be embedded in the dielectric substrate 110 and between the first surface E1 and the second surface E2. The third feeding metal element 152 is coupled to a third signal source 193 and is adjacent to the third metal loop 151. A third coupling gap GC3 may be formed between the third metal loop 151 and the third feeding metal element 152. Specifically, a fifth feeding point FP5 and a sixth feeding point FP6 are respectively positioned at two ends of the third feeding metal element 152. The third signal source 193 is coupled to either the fifth feeding point FP5 or the sixth feeding point FP6, so as to excite the third antenna unit 150.

The fourth antenna unit 160 includes a fourth metal loop 161 and a fourth feeding metal element 162. For example, the fourth metal loop 161 may substantially have a relatively large square shape. The fourth metal loop 161 is disposed on the first surface E1 of the dielectric substrate 110. The fourth metal loop 161 has a fourth hollow portion 165. The fourth hollow portion 165 may substantially have a relatively small square shape. The fourth feeding metal element 162 may substantially have an L-shape. The fourth feeding metal element 162 may be at least partially perpendicular to and at least partially parallel to the fourth metal loop 161. The fourth feeding metal element 162 may be embedded in the dielectric substrate 110 and between the first surface E1 and the second surface E2. The fourth feeding metal element 162 is coupled to a fourth signal source 194 and is adjacent to the fourth metal loop 161. A fourth coupling gap GC4 may be formed between the fourth metal loop 161 and the fourth feeding metal element 162. Specifically, a seventh feeding point FP7 and an eighth feeding point FP8 are respectively positioned at two ends of the fourth feeding metal element 162. The fourth signal source 194 is coupled to either the seventh feeding point FP7 or the eighth feeding point FP8, so as to excite the fourth antenna unit 160.

As a whole, the first metal loop 131, the second metal loop 141, the third metal loop 151, and the fourth metal loop 161 may have the same structures, and they may be arranged in the same straight-line. In some embodiments, the first metal loop 131, the second metal loop 141, the third metal loop 151, and the fourth metal loop 161 have vertical projections on the second surface E2 of the dielectric substrate 110, and the entirety of each vertical projection is inside the ground metal plane 120. The shapes of the first metal loop 131, the second metal loop 141, the third metal loop 151, and the fourth metal loop 161 are not limited in the invention. In alternative embodiments, each of the first metal loop 131, the second metal loop 141, the third metal loop 151, and the fourth metal loop 161 substantially has a circular shape, a rectangular shape, an elliptical shape, a regular triangular shape, or a regular hexagonal shape.

In some embodiments, the operation principles of the antenna array 300 are described as follows. The radiation pattern of the antenna array 300 will provide a first polarization direction if the first signal source 191 is coupled to the first feeding point FP1, the second signal source 192 is coupled to the third feeding point FP3, the third signal source 193 is coupled to the fifth feeding point FP5, and the fourth signal source 194 is coupled to the seventh feeding point FP7. Conversely, the radiation pattern of the antenna array 300 will provide a second polarization direction which is substantially perpendicular to the first polarization direction if the first signal source 191 is coupled to the second feeding point FP2, the second signal source 192 is coupled to the fourth feeding point FP4, the third signal source 193 is coupled to the sixth feeding point FP6, and the fourth signal source 194 is coupled to the eighth feeding point FP8. For example, the first polarization direction may be horizontally-polarized (parallel to the XY-plane), and the second polarization direction may be vertically-polarized (parallel to the Z-axis), but they are not limited thereto. Thus, the antenna array 300 can transmit or receive signals with different polarization directions by selecting appropriate feeding points. Furthermore, the main beam direction of the antenna array 300 is adjustable by changing the phase differences between the first signal source 191, the second signal source 192, the third signal source 193, and the fourth signal source 194.

In some embodiments, the element sizes and element parameters of the antenna array 300 are described as follows. The thickness H1 of the dielectric substrate 110 may be from 0.6 mm to 1 mm, such as about 0.8 mm. The dielectric constant of the dielectric substrate 110 may be from 3 to 5, such as about 3.48. The length L1 of the first hollow portion 135 of the first metal loop 131, the length L2 of the second hollow portion 145 of the second metal loop 141, the length L3 of the third hollow portion 155 of the third metal loop 151, and the length L4 of the fourth hollow portion 165 of the fourth metal loop 161 may all be substantially equal to 0.25 wavelength ($\lambda/4$) of the first frequency band FB1 of the antenna array 300. The width W1 of the first metal loop 131, the width W2 of the second metal loop 141, the width W3 of the third metal loop 151, and the width W4 of the fourth metal loop 161 may all be from 0.1 mm to 0.5 mm, such as 0.3 mm. The length L5 of the first feeding metal element 132, the length L6 of the second feeding metal element 142, the length L7 of the third feeding metal element 152, and the length L8 of the fourth feeding metal element 162 may all be substantially equal to 0.25 wavelength ($\lambda/4$) of the second frequency band FB2 of the antenna array 300. The center-to-center distance D1 between the first metal loop 131 and the second metal loop 141, the center-to-center distance D2 between the second metal loop 141 and the third metal loop 151, and the center-to-center distance D3 between the third metal loop 151 and the fourth metal loop 161 may all be from 0.4 to 1 wavelength ($0.4\lambda \sim 1\lambda$) of the first frequency band FB1 of the antenna array 300. The width of the first coupling gap GC1, the width of the second coupling gap GC2, the width of the third coupling gap GC3, and the width of the fourth coupling gap GC4 may all be from 0.1 mm to 0.3 mm, such as 0.2 mm.

The above ranges of element sizes and element parameters are calculated and obtained according to many experiment results, and they help to optimize the total beam width, the operational bandwidth, and the impedance matching of the antenna array 300. Other features of the antenna array 300 of FIG. 3A and FIG. 3B are similar to those of the antenna array 100 of FIG. 1. Accordingly, the two embodiments can achieve similar levels of performance.

Figure 4A:
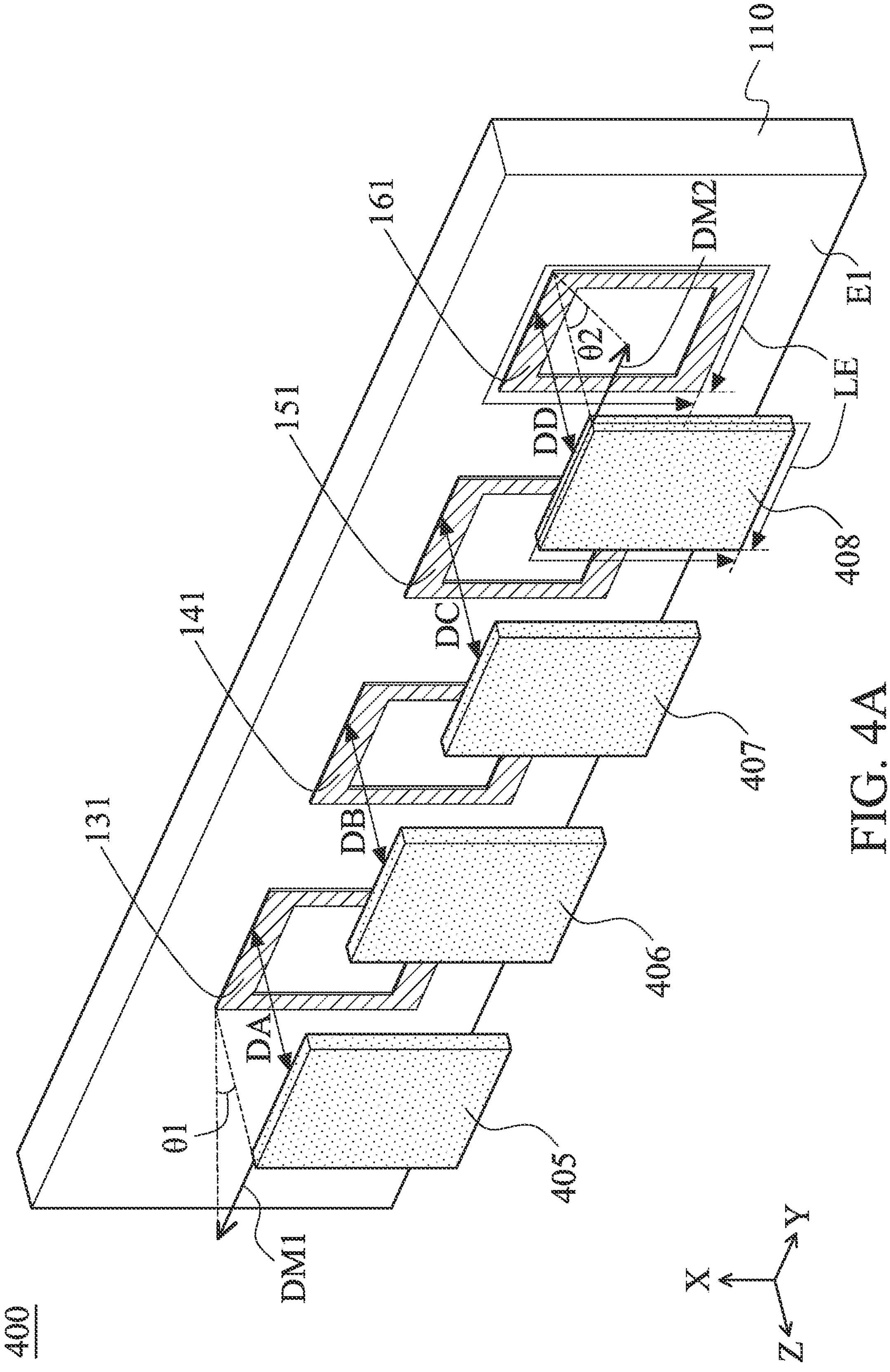
FIG. 4A is a perspective view of an antenna array according to an embodiment of the invention.

FIG. 4A is a perspective view of an antenna array 400 according to an embodiment of the invention. FIG. 4A is similar to FIG. 3A and FIG. 3B. In the embodiment of FIG. 4A, the antenna array 400 further includes a first auxiliary metal element 405, a second auxiliary metal element 406, a third auxiliary metal element 407, and a fourth auxiliary metal element 408, each of which may substantially have a square shape (solid). The antenna array 400 can also cover the first frequency band FB1 and the second frequency band FB2 as mentioned above.

The first auxiliary metal element 405 has a first vertical projection on the first surface E1 of the dielectric substrate 110, and the first vertical projection at least partially overlaps the first metal loop 131. For example, the central point of the first auxiliary metal element 405 may be exactly aligned with the central point of the first metal loop 131. The second auxiliary metal element 406 has a second vertical projection on the first surface E1 of the dielectric substrate 110, and the second vertical projection at least partially overlaps the second metal loop 141. For example, the central point of the second auxiliary metal element 406 may be exactly aligned with the central point of the second metal loop 141. The third auxiliary metal element 407 has a third vertical projection on the first surface E1 of the dielectric substrate 110, and the third vertical projection at least partially overlaps the third metal loop 151. For example, the central point of the third auxiliary metal element 407 may be exactly aligned with the central point of the third metal loop 151. The fourth auxiliary metal element 408 has a fourth vertical projection on the first surface E1 of the dielectric substrate 110, and the fourth vertical projection at least partially overlaps the fourth metal loop 161. For example, the central point of the fourth auxiliary metal element 408 may be exactly aligned with the central point of the fourth metal loop 161.

In some embodiments, a first distance DA is defined between the first auxiliary metal element 405 and the first metal loop 131, a second distance DB is defined between the second auxiliary metal element 406 and the second metal loop 141, a third distance DC is defined between the third auxiliary metal element 407 and the third metal loop 151, and a fourth distance DD is defined between the fourth auxiliary metal element 408 and the fourth metal loop 161. Each of the first distance DA, the second distance DB, the third distance DC, and the fourth distance DD may be from 0.125 to 0.5 wavelength of the first frequency band FB1 (i.e., λ/8~λ/2). In some embodiments, the first auxiliary metal element 405, the second auxiliary metal element 406, the third auxiliary metal element 407, the fourth auxiliary metal element 408, the first metal loop 131, the second metal loop 141, the third metal loop 151, and the fourth metal loop 161 substantially have the same perimeters LE (i.e., the outer perimeters). According to practical measurements, the above ranges of element sizes can help to maximize the radiation gain of the antenna array 400.

It should be understood that the distances between the first auxiliary metal element 405, the second auxiliary metal element 406, the third auxiliary metal element 407, and the fourth auxiliary metal element 408 substantially correspond to the distances between the first metal loop 131, the second metal loop 141, the third metal loop 151, and the fourth metal loop 161. In alternative embodiments, the shift angle of the main beam of the antenna array 400 is fine-tuned by changing the distances between the first auxiliary metal element 405, the second auxiliary metal element 406, the third auxiliary metal element 407, and the fourth auxiliary metal element 408.

Figure 4B:
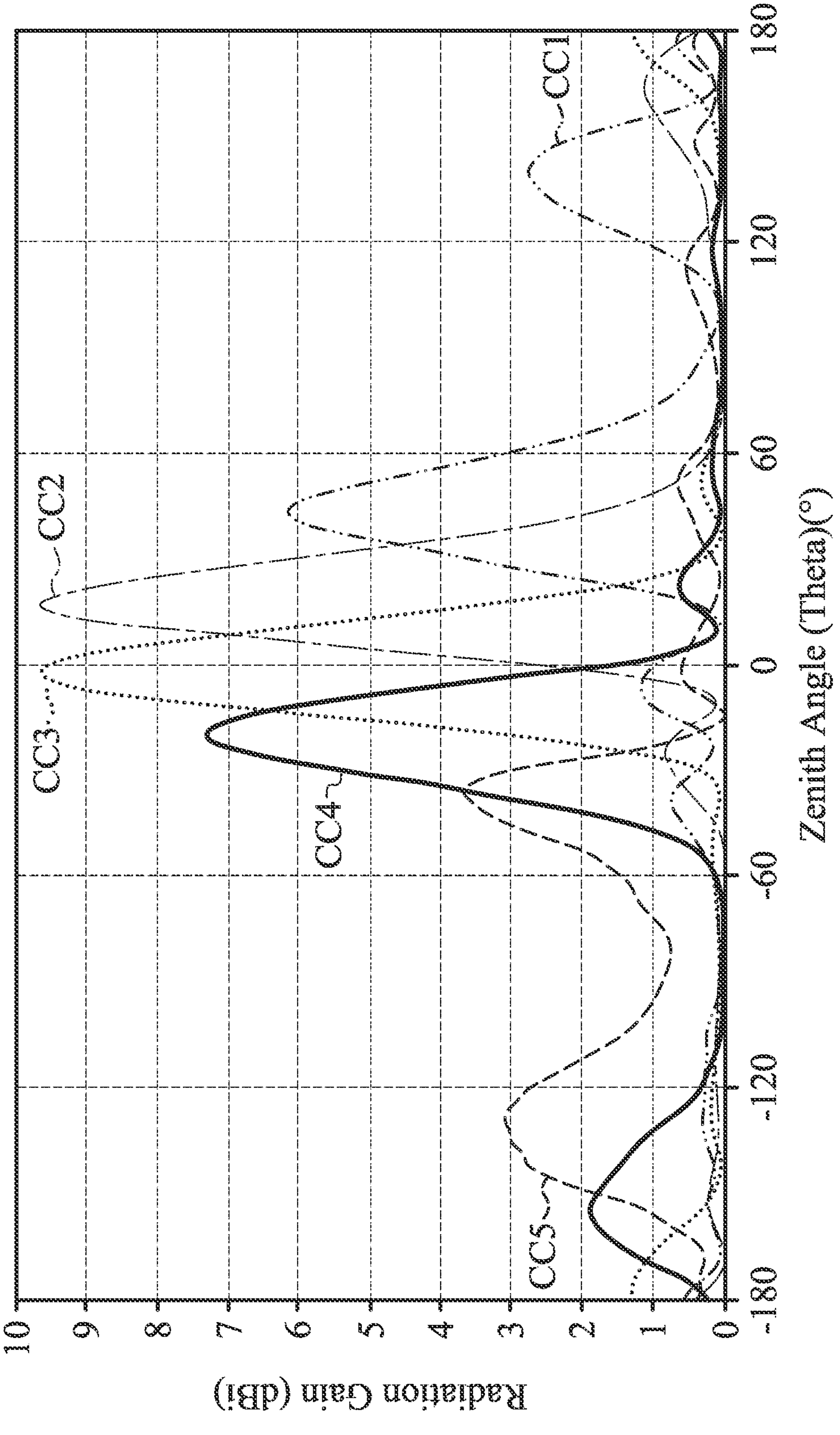
FIG. 4B is a diagram of radiation gain of an antenna array operating in a first frequency band according to an embodiment of the invention.

FIG. 4B is a diagram of radiation gain of the antenna array 400 operating in the first frequency band FB1 according to an embodiment of the invention (it may be measured on the XZ-plane). The horizontal axis represents the zenith angle (Theta) (degrees), and the vertical axis represents the radiation gain (dBi). As shown in FIG. 4B, a first curve CC1 represents the radiation pattern of the antenna array 400 when the aforementioned feeding phase difference is equal to −120 degrees, a second curve CC2 represents the radiation pattern of the antenna array 400 when the aforementioned feeding phase difference is equal to −60 degrees, a third curve CC3 represents the radiation pattern of the antenna array 400 when the aforementioned feeding phase difference is equal to 0 degrees, a fourth curve CC4 represents the radiation pattern of the antenna array 400 when the aforementioned feeding phase difference is equal to 60 degrees, and a fifth curve CC5 represents the radiation pattern of the antenna array 400 when the aforementioned feeding phase difference is equal to 120 degrees. Therefore, the antenna array 400 can provide an almost omnidirectional radiation pattern by controlling its feeding phase difference. It should be noted that the maximum radiation gain of the antenna array 400 can be enhanced by about 2.7 dBi after the first auxiliary metal element 405, the second auxiliary metal element 406, the third auxiliary metal element 407, and the fourth auxiliary metal element 408 are used. Other features of the antenna array 400 of FIG. 4A are similar to those of the antenna array 300 of FIG. 3A and FIG. 3B. Accordingly, the two embodiments can achieve similar levels of performance.

In some embodiments, the first auxiliary metal element 405 is moved outwardly by a first shift distance DM1, and the fourth auxiliary metal element 408 is moved outwardly by a second shift distance DM2 (the first auxiliary metal element 405 and the fourth auxiliary metal element 408 may be both moved parallel to the dielectric substrate 110). That is, according to the normal direction of the dielectric substrate 110, a first shift angle θ1 can be provided to the first auxiliary metal element 405, and a second shift angle θ2 can be provided to the fourth auxiliary metal element 408. Their relationship may be described according to the following equations (1) and (2).

$$DM1=DA\cdot\tan(\theta 1) \quad (1)$$

$$DM2=DD\cdot\tan(\theta 2) \quad (2)$$

where "DM1" represents the first shift distance DM1, "DM2" represents the second shift distance DM2, "DA" represents the first distance DA, "DD" represents the fourth distance DD, "θ1" represents the first shift angle θ1, and "θ2" represents the second shift angle θ2.

According to practical measurements, a designer can fine-tune and rotate the main beam direction of the antenna array 400 by changing the first shift angle θ1 and the second shift angle θ2. In some embodiments, if the first shift angle θ1 and the second shift angle θ2 are between 0 and 30 degrees, the main beam direction of the antenna array 400 will be rotated by 0 to 30 degrees, so as to meet different requirements of designs.

Figure 5A:
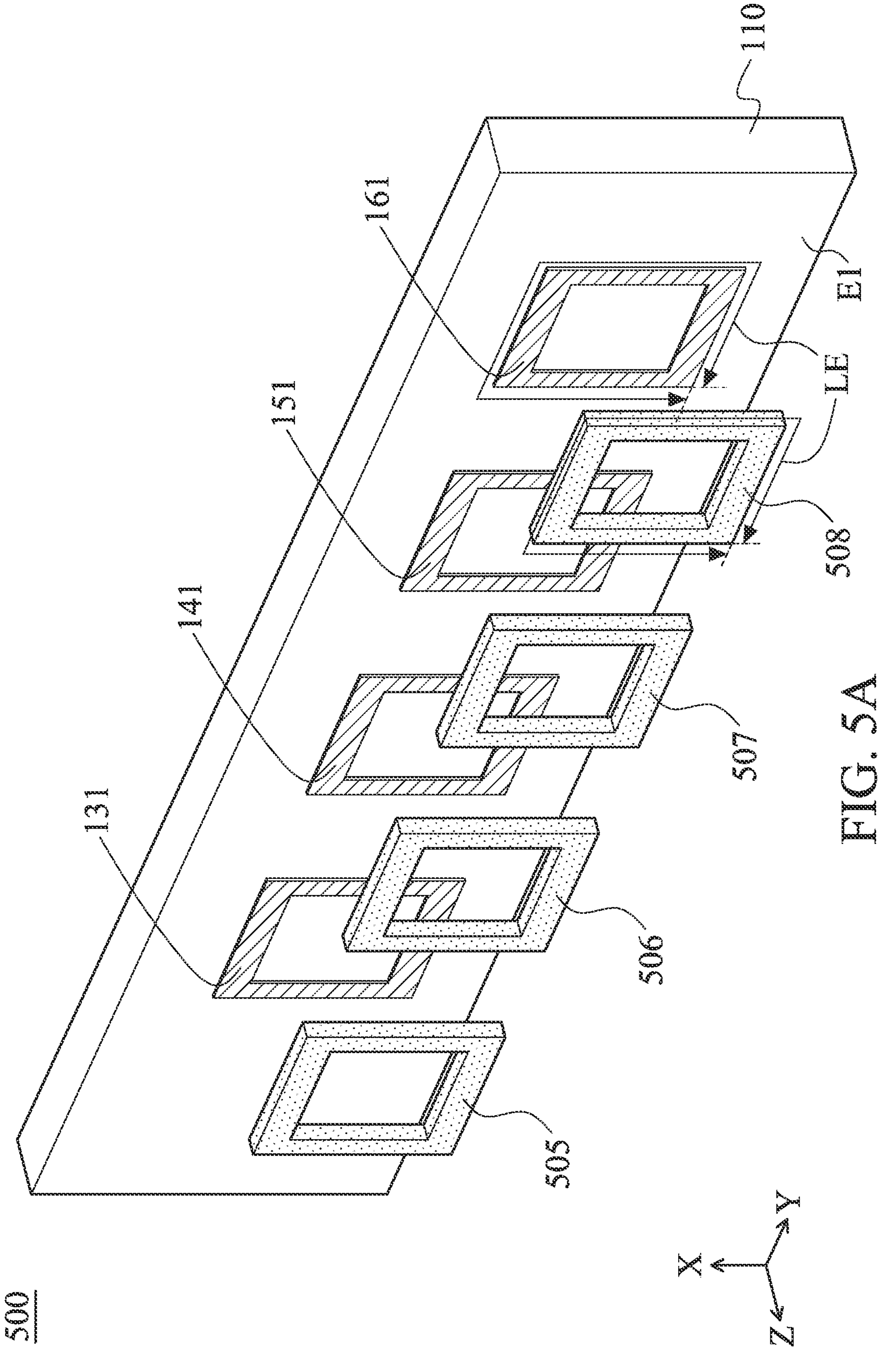
FIG. 5A is a perspective view of an antenna array according to an embodiment of the invention.

FIG. 5A is a perspective view of an antenna array 500 according to an embodiment of the invention. FIG. 5A is similar to FIG. 4A. In the embodiment of FIG. 5A, the antenna array 500 further includes a first auxiliary metal element 505, a second auxiliary metal element 506, a third auxiliary metal element 507, and a fourth auxiliary metal element 508, each of which may substantially have a square-ring shape (hollow). The antenna array 500 can also cover the first frequency band FB1 and the second frequency band FB2 as mentioned above.

The first auxiliary metal element 505 has a first vertical projection on the first surface E1 of the dielectric substrate 110, and the first vertical projection at least partially (or completely) overlaps the first metal loop 131. For example, the central point of the first auxiliary metal element 505 may be exactly aligned with the central point of the first metal loop 131. The second auxiliary metal element 506 has a second vertical projection on the first surface E1 of the dielectric substrate 110, and the second vertical projection at least partially (or completely) overlaps the second metal loop 141. For example, the central point of the second auxiliary metal element 506 may be exactly aligned with the central point of the second metal loop 141. The third auxiliary metal element 507 has a third vertical projection on the first surface E1 of the dielectric substrate 110, and the third vertical projection at least partially (or completely) overlaps the third metal loop 151. For example, the central point of the third auxiliary metal element 507 may be exactly aligned with the central point of the third metal loop 151. The fourth auxiliary metal element 508 has a fourth vertical projection on the first surface E1 of the dielectric substrate 110, and the fourth vertical projection at least partially (or completely) overlaps the fourth metal loop 161. For example, the central point of the fourth auxiliary metal element 508 may be exactly aligned with the central point of the fourth metal loop 161. In some embodiments, the first auxiliary metal element 505, the second auxiliary metal element 506, the third auxiliary metal element 507, the fourth auxiliary metal element 508, the first metal loop 131, the second metal loop 141, the third metal loop 151, and the fourth metal loop 161 substantially have the same perimeters LE.

Figure 5B:
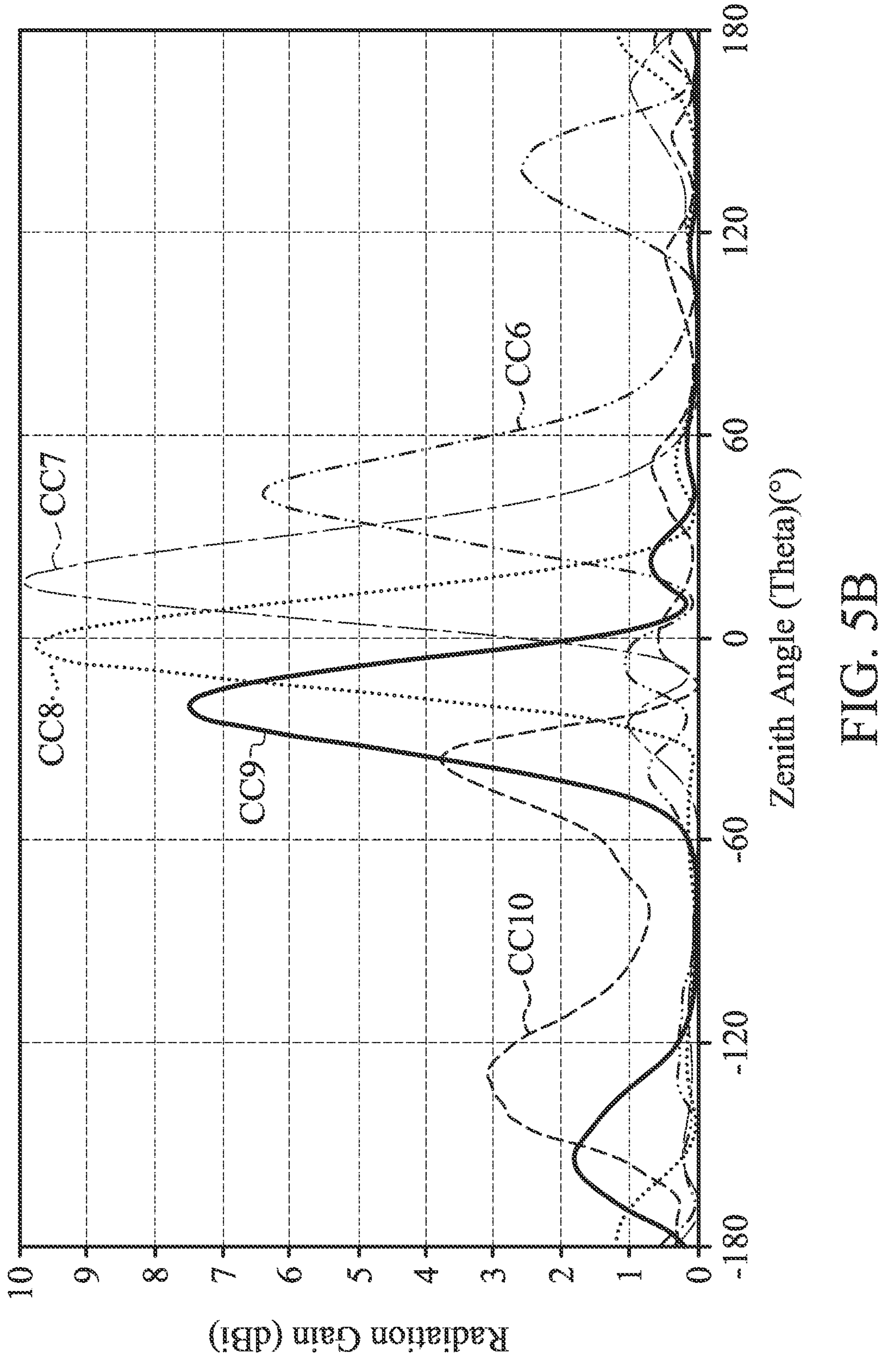
FIG. 5B is a diagram of radiation gain of an antenna array operating in a first frequency band according to an embodiment of the invention.

FIG. 5B is a diagram of radiation gain of the antenna array 500 operating in the first frequency band FB1 according to an embodiment of the invention. The horizontal axis represents the zenith angle (Theta) (degrees), and the vertical axis represents the radiation gain (dBi). As shown in FIG. 5B, a sixth curve CC6 represents the radiation pattern of the antenna array 500 when the aforementioned feeding phase difference is equal to −120 degrees, a seventh curve CC7 represents the radiation pattern of the antenna array 500 when the aforementioned feeding phase difference is equal to −60 degrees, an eighth curve CC8 represents the radiation pattern of the antenna array 500 when the aforementioned feeding phase difference is equal to 0 degrees, a ninth curve CC9 represents the radiation pattern of the antenna array 500 when the aforementioned feeding phase difference is equal to 60 degrees, and a tenth curve CC10 represents the radiation pattern of the antenna array 500 when the aforementioned feeding phase difference is equal to 120 degrees. It should be noted that the maximum radiation gain of the antenna array 500 can be enhanced by about 2.9 dBi after the first auxiliary metal element 505, the second auxiliary metal element 506, the third auxiliary metal element 507, and the fourth auxiliary metal element 508 are used. Other features of the antenna array 500 of FIG. 5A are similar to those of the antenna array 400 of FIG. 4A. Accordingly, the two embodiments can achieve similar levels of performance.

Figure 6A:
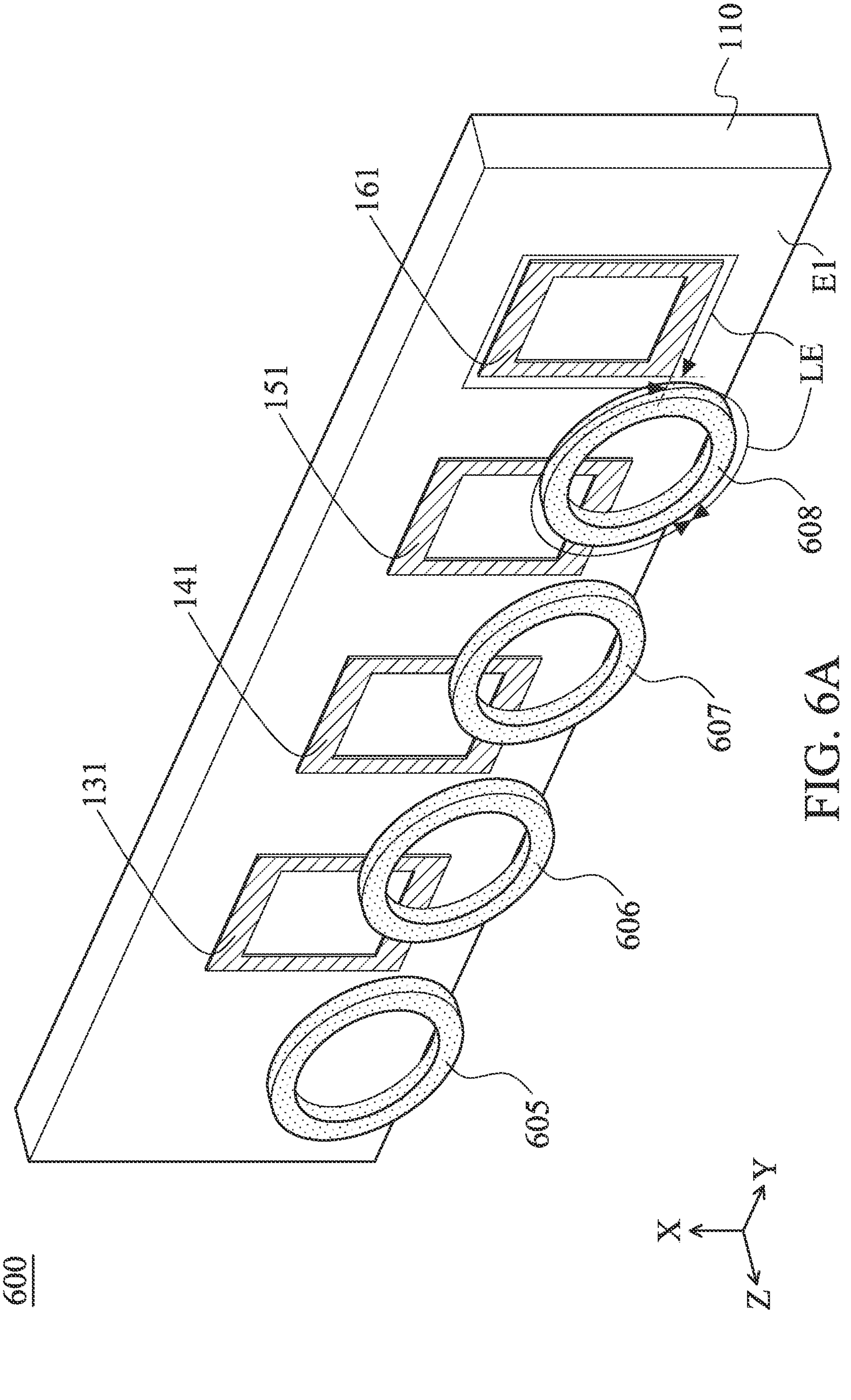
FIG. 6A is a perspective view of an antenna array according to an embodiment of the invention.

FIG. 6A is a perspective view of an antenna array 600 according to an embodiment of the invention. FIG. 6A is similar to FIG. 4A. In the embodiment of FIG. 6A, the antenna array 600 further includes a first auxiliary metal element 605, a second auxiliary metal element 606, a third auxiliary metal element 607, and a fourth auxiliary metal element 608, each of which may substantially have a circular-ring shape (hollow). The antenna array 600 can also cover the first frequency band FB1 and the second frequency band FB2 as mentioned above.

The first auxiliary metal element 605 has a first vertical projection on the first surface E1 of the dielectric substrate 110, and the first vertical projection at least partially overlaps the first metal loop 131. For example, the central point of the first auxiliary metal element 605 may be exactly aligned with the central point of the first metal loop 131. The second auxiliary metal element 606 has a second vertical projection on the first surface E1 of the dielectric substrate 110, and the second vertical projection at least partially overlaps the second metal loop 141. For example, the central point of the second auxiliary metal element 606 may be exactly aligned with the central point of the second metal loop 141. The third auxiliary metal element 607 has a third vertical projection on the first surface E1 of the dielectric substrate 110, and the third vertical projection at least partially overlaps the third metal loop 151. For example, the central point of the third auxiliary metal element 607 may be exactly aligned with the central point of the third metal loop 151. The fourth auxiliary metal element 608 has a fourth vertical projection on the first surface E1 of the dielectric substrate 110, and the fourth vertical projection at least partially overlaps the fourth metal loop 161. For example, the central point of the fourth auxiliary metal element 608 may be exactly aligned with the central point of the fourth metal loop 161. In some embodiments, the first auxiliary metal element 605, the second auxiliary metal element 606, the third auxiliary metal element 607, the fourth auxiliary metal element 608, the first metal loop 131, the second metal loop 141, the third metal loop 151, and the fourth metal loop 161 substantially have the same perimeters LE.

Figure 6B:
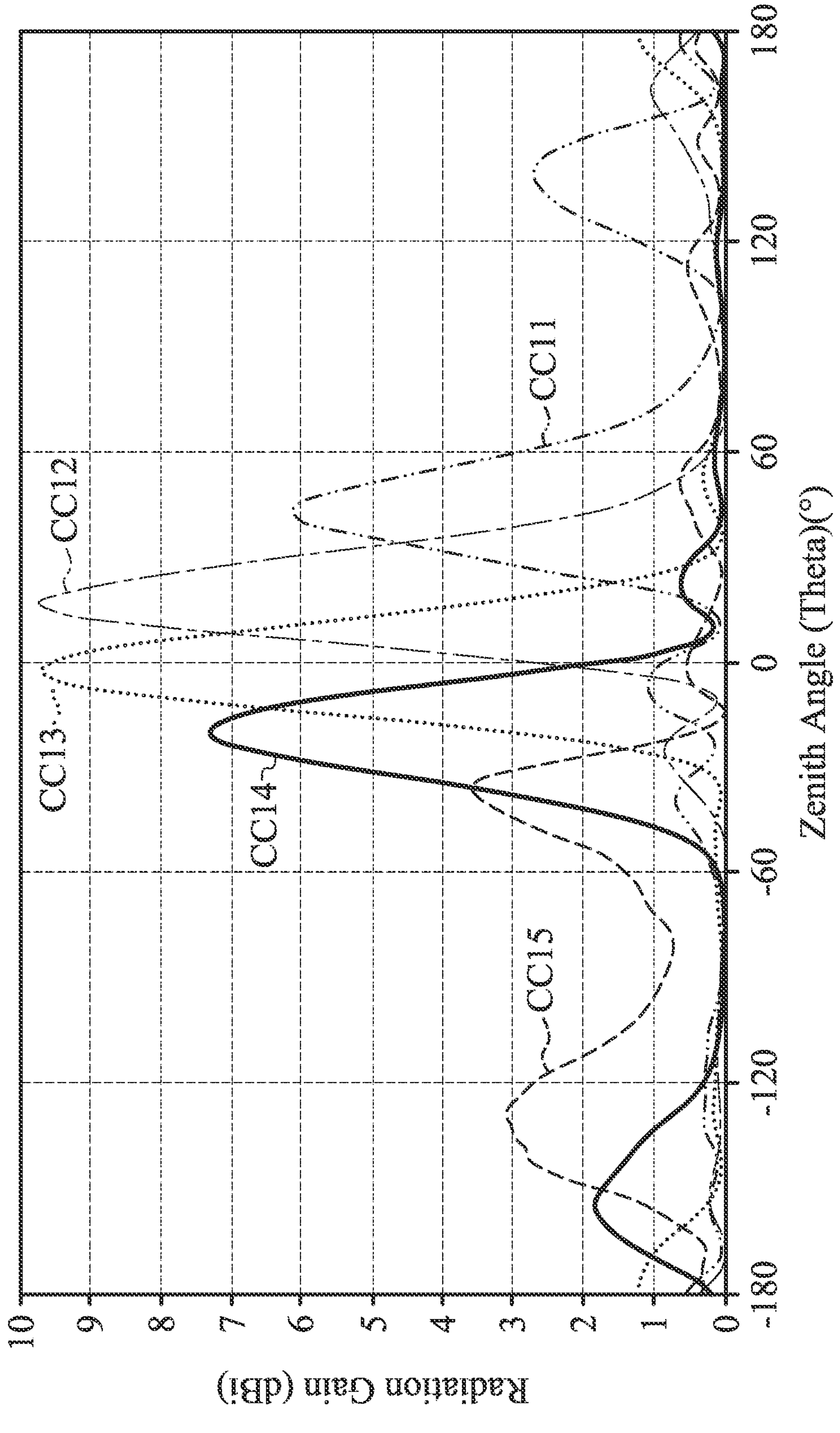
FIG. 6B is a diagram of radiation gain of an antenna array operating in a first frequency band according to an embodiment of the invention.

FIG. 6B is a diagram of radiation gain of the antenna array 600 operating in the first frequency band FB1 according to an embodiment of the invention. The horizontal axis represents the zenith angle (Theta) (degrees), and the vertical axis represents the radiation gain (dBi). As shown in FIG. 6B, an eleventh curve CC11 represents the radiation pattern of the antenna array 600 when the aforementioned feeding phase difference is equal to −120 degrees, a twelfth curve CC12 represents the radiation pattern of the antenna array 600 when the aforementioned feeding phase difference is equal to −60 degrees, a thirteenth curve CC13 represents the radiation pattern of the antenna array 600 when the aforementioned feeding phase difference is equal to 0 degrees, a fourteenth curve CC14 represents the radiation pattern of the antenna array 600 when the aforementioned feeding phase difference is equal to 60 degrees, and a fifteenth curve CC15 represents the radiation pattern of the antenna array 600 when the aforementioned feeding phase difference is equal to 120 degrees. It should be noted that the maximum radiation gain of the antenna array 600 can be enhanced by about 2.9 dBi after the first auxiliary metal element 605, the second auxiliary metal element 606, the third auxiliary metal element 607, and the fourth auxiliary metal element 608 are used. Other features of the antenna array 600 of FIG. 6A are similar to those of the antenna array 400 of FIG. 4A. Accordingly, the two embodiments can achieve similar levels of performance.

The invention proposes a novel antenna array. In comparison to the conventional design, the invention has at least the advantages of high radiation gain, multiple polarization directions, small size, wide bandwidth, and low manufacturing cost, and therefore it is suitable for application in a variety of mobile communication devices.

Note that the above element sizes, element shapes, element parameters, and frequency ranges are not limitations of the invention. An antenna designer can fine-tune these settings or values according to different requirements. It should be understood that the antenna array of the invention is not limited to the configurations of FIGS. 1-6. The invention may include any one or more features of any one or more embodiments of FIGS. 1-6. In other words, not all of the features displayed in the figures should be implemented in the antenna array of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. An antenna array, comprising:

a first antenna unit;

a second antenna unit;

a third antenna unit;

a fourth antenna unit;

a first auxiliary metal element, disposed adjacent to the first antenna unit;

a second auxiliary metal element, disposed adjacent to the second antenna unit;

a third auxiliary metal element, disposed adjacent to the third antenna unit; and a fourth auxiliary metal element, disposed adjacent to the fourth antenna unit;

wherein the first auxiliary metal element, the second auxiliary metal element, the third auxiliary metal element, and the fourth auxiliary metal element are configured to increase radiation gain of the antenna array;

wherein the first auxiliary metal element, the second auxiliary metal element, the third auxiliary metal element, and the fourth auxiliary metal element are substantially arranged in a same straight line and are substantially disposed on a same plane;

wherein the first auxiliary metal element is moved outwardly by a first shift distance, so that a first shift angle is provided to the first auxiliary metal element;

wherein the fourth auxiliary metal element is moved outwardly by a second shift distance, so that a second shift angle is provided to the fourth auxiliary metal element;

wherein both the first shift angle and the second shift angle are between 0 and 30 degrees.

2. The antenna array as claimed in claim 1, wherein the first antenna unit, the second antenna unit, the third antenna unit, and the fourth antenna unit cover a first frequency band and a second frequency band of millimeter-wave operations.

3. The antenna array as claimed in claim 1, wherein each of the first auxiliary metal element, the second auxiliary metal element, the third auxiliary metal element, and the fourth auxiliary metal element substantially has a square shape.

4. The antenna array as claimed in claim 1, wherein each of the first auxiliary metal element, the second auxiliary metal element, the third auxiliary metal element, and the fourth auxiliary metal element substantially has a square-ring shape.

5. The antenna array as claimed in claim 1, wherein each of the first auxiliary metal element, the second auxiliary metal element, the third auxiliary metal element, and the fourth auxiliary metal element substantially has a circular-ring shape.

6. The antenna array as claimed in claim 2, further comprising:

a dielectric substrate, having a first surface and a second surface opposite to each other; and a ground metal plane, disposed on the second surface of the dielectric substrate.

7. The antenna array as claimed in claim 6, wherein:

the first antenna unit comprises a first metal loop and a first feeding metal element, and the first feeding metal element is coupled to a first signal source and is adjacent to the first metal loop;

the second antenna unit comprises a second metal loop and a second feeding metal element, and the second feeding metal element is coupled to a second signal source and is adjacent to the second metal loop;

the third antenna unit comprises a third metal loop and a third feeding metal element, and the third feeding metal element is coupled to a third signal source and is adjacent to the third metal loop;

the fourth antenna unit comprises a fourth metal loop and a fourth feeding metal element, and the fourth feeding metal element is coupled to a fourth signal source and is adjacent to the fourth metal loop; and the first metal loop, the second metal loop, the third metal loop, and the fourth metal loop are disposed on the first surface of the dielectric substrate.

8. The antenna array as claimed in claim 7, wherein the first auxiliary metal element has a first vertical projection on the first surface of the dielectric substrate, the first vertical projection at least partially overlaps the first metal loop, the second auxiliary metal element has a second vertical projection on the first surface of the dielectric substrate, the second vertical projection at least partially overlaps the second metal loop, the third auxiliary metal element has a third vertical projection on the first surface of the dielectric substrate, the third vertical projection at least partially overlaps the third metal loop, the fourth auxiliary metal element has a fourth vertical projection on the first surface of the dielectric substrate, and the fourth vertical projection at least partially overlaps the fourth metal loop.

9. The antenna array as claimed in claim 7, wherein the first auxiliary metal element, the second auxiliary metal element, the third auxiliary metal element, the fourth auxiliary metal element, the first metal loop, the second metal loop, the third metal loop, and the fourth metal loop substantially have same perimeters.

10. The antenna array as claimed in claim 7, wherein a first distance is defined between the first auxiliary metal element and the first metal loop, a second distance is defined between the second auxiliary metal element and the second metal loop, a third distance is defined between the third auxiliary metal element and the third metal loop, and a fourth distance is defined between the fourth auxiliary metal element and the fourth metal loop, and wherein each of the first distance, the second distance, the third distance, and the fourth distance is from 0.125 to 0.5 wavelength of the first frequency band.

11. The antenna array as claimed in claim 7, wherein each of the first metal loop, the second metal loop, the third metal loop, and the fourth metal loop substantially has a relatively large square shape.

12. The antenna array as claimed in claim 7, wherein the first metal loop has a first hollow portion, the second metal loop has a second hollow portion, the third metal loop has a third hollow portion, the fourth metal loop has a fourth hollow portion, and each of the first hollow portion, the second hollow portion, the third hollow portion, and the fourth hollow portion substantially has a relatively small square shape.

13. The antenna array as claimed in claim 7, wherein a length of each of the first hollow portion, the second hollow portion, the third hollow portion, and the fourth hollow portion is substantially equal to 0.25 wavelength of the first frequency band.

14. The antenna array as claimed in claim 7, wherein a center-to-center distance between any adjacent two of the first metal loop, the second metal loop, the third metal loop, and the fourth metal loop is from 0.4 to 1 wavelength of the first frequency band.

15. The antenna array as claimed in claim 7, wherein the first feeding metal element, the second feeding metal element, the third feeding metal element, and the fourth feeding metal element are embedded in the dielectric substrate and between the first surface and the second surface.

16. The antenna array as claimed in claim 7, wherein each of the first feeding metal element, the second feeding metal element, the third feeding metal element, and the fourth feeding metal element substantially has an L-shape.

17. The antenna array as claimed in claim 7, wherein each of the first feeding metal element, the second feeding metal element, the third feeding metal element, and the fourth feeding metal element is at least partially perpendicular to and at least partially parallel to a corresponding one of the first metal loop, the second metal loop, the third metal loop, and the fourth metal loop.

18. The antenna array as claimed in claim 7, wherein a length of each of the first feeding metal element, the second feeding metal element, the third feeding metal element, and the fourth feeding metal element is substantially equal to 0.25 wavelength of the second frequency band.

19. The antenna array as claimed in claim 7, wherein a first feeding point and a second feeding point are respectively positioned at two ends of the first feeding metal element, a third feeding point and a fourth feeding point are respectively positioned at two ends of the second feeding metal element, a fifth feeding point and a sixth feeding point are respectively positioned at two ends of the third feeding metal element, and a seventh feeding point and an eighth feeding point are respectively positioned at two ends of the fourth feeding metal element.

20. The antenna array as claimed in claim 19, wherein the first signal source is coupled to the first feeding point or the second feeding point so as to excite the first antenna unit, the second signal source is coupled to the third feeding point or the fourth feeding point so as to excite the second antenna unit, the third signal source is coupled to the fifth feeding point or the sixth feeding point so as to excite the third antenna unit, and the fourth signal source is coupled to the seventh feeding point or the eighth feeding point so as to excite the fourth antenna unit.

* * * * *